US005474189A

United States Patent [19]
Peterson

[11] Patent Number: 5,474,189
[45] Date of Patent: Dec. 12, 1995

[54] BICYCLE LIFT AND STORAGE SYSTEM

[76] Inventor: Conrad Peterson, 6013 S. Lamar Dr., Littleton, Colo. 80123

[21] Appl. No.: 252,592

[22] Filed: Jun. 1, 1994

[51] Int. Cl.[6] ............................................. A47F 5/00
[52] U.S. Cl. ........................... 211/18; 211/17; 211/96; 248/284.1
[58] Field of Search .................. 211/17, 18, 99, 211/100, 103; 248/284; 312/246, 247, 322, 323

[56] References Cited

U.S. PATENT DOCUMENTS

| | | | |
|---|---|---|---|
| 3,417,874 | 12/1968 | Bryant | 211/100 |
| 3,770,133 | 11/1973 | Kolker | 211/17 |
| 3,872,972 | 3/1975 | Cummins et al. | 211/17 |
| 3,883,002 | 5/1975 | Moore | 211/5 |
| 3,907,113 | 9/1975 | Kropelinitski | 211/17 |
| 3,924,751 | 12/1975 | Ballenger | 211/18 |
| 4,114,764 | 9/1978 | Rich | 211/100 |
| 5,183,162 | 2/1993 | Ritzenthaler | 211/1.57 |
| 5,199,843 | 4/1993 | Sferra | 414/609 |
| 5,294,006 | 3/1994 | Deschino | 211/18 |
| 5,354,035 | 10/1994 | Helgren | 211/18 X |

FOREIGN PATENT DOCUMENTS 3273981  12/1991  Japan .................................... 211/17

*Primary Examiner*—Robert W. Gibson, Jr.
*Attorney, Agent, or Firm*—John E. Reilly

[57] ABSTRACT

A lift and storage apparatus for bicycles includes a bicycle support rack which can be lifted from an upright position on the floor of a garage or other enclosure into a raised, horizontal position adjacent to the ceiling under the control of a pivotal lift arm and a cam surface in the path of movement of the upper end of the support rack, and the support rack is capable of supporting one or two bicycles in side-by-side relation to one another.

19 Claims, 3 Drawing Sheets

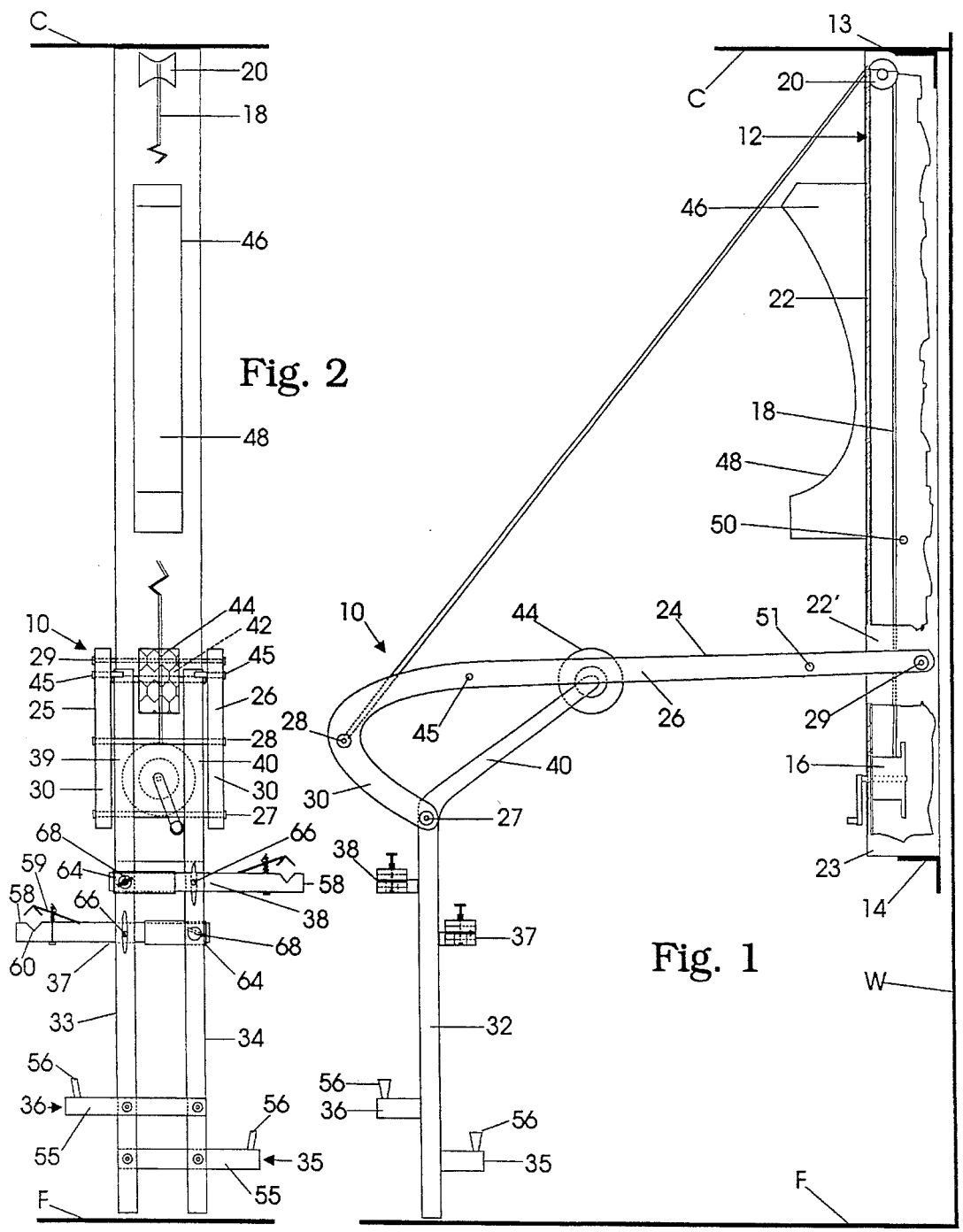

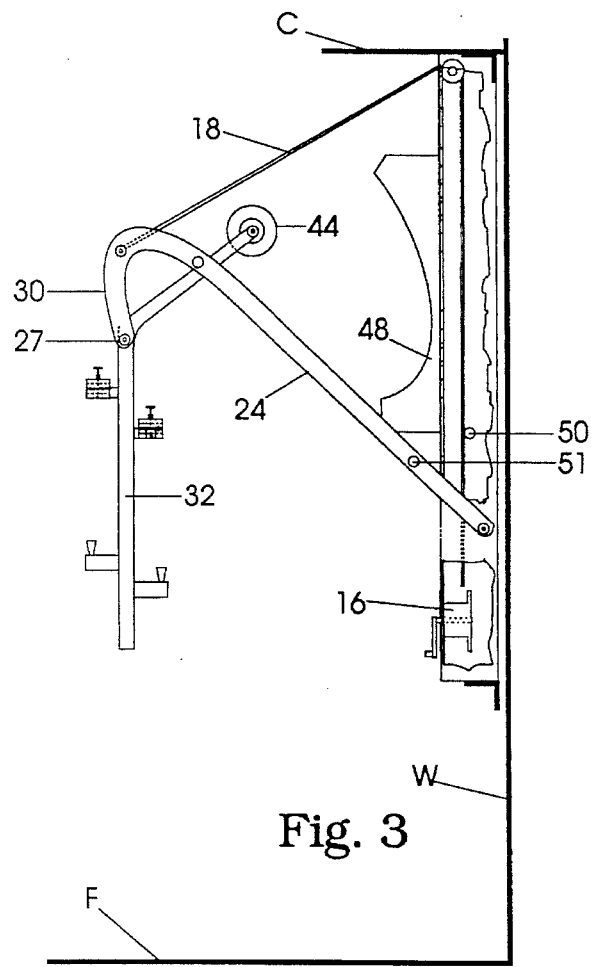
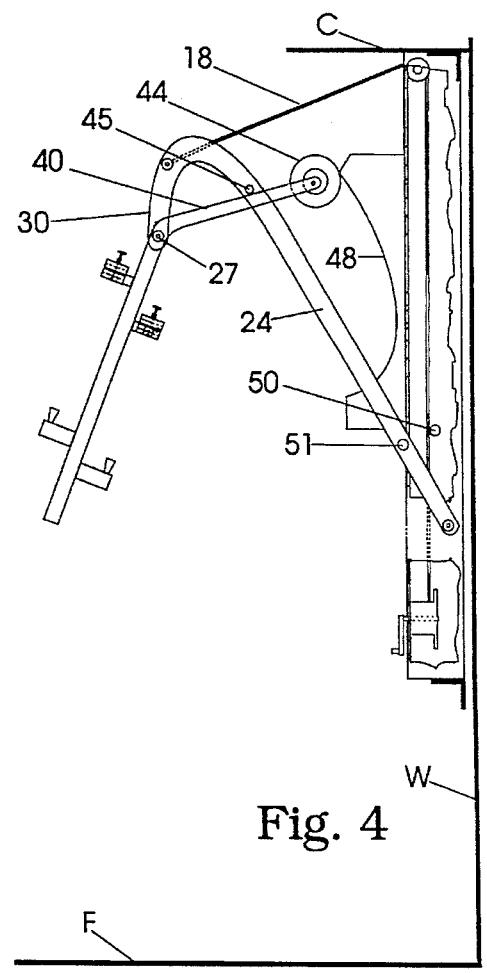
Fig. 3
Fig. 4

5,474,189

BICYCLE LIFT AND STORAGE SYSTEM

FIELD OF INVENTION

This invention relates to storage apparatus; and more particularly relates to a novel and improved apparatus for lifting and storing large objects, such as, bicycles in an out-of-the-way position when not in use.

BACKGROUND OF INVENTION

Various systems have been devised for storing bicycles in a secure location and particularly in confined areas, such as, garages where space is at a premium. Typically, the approach has been to mount the bicycle on a wall or to lift into an overhead position so as not to occupy usable space in the area. For example, U.S. Pat. No. 3,872,972 to Cummins et al employs a pulley system for lifting a bicycle into an overhead position in a garage and requires the use of a separate pulley having a hook which must be drawn downwardly to attach to a portion of the bicycle and swing the bicycle upwardly into the storage position. U.S. Pat. No. 3,924,751 to Ballenger is directed to a storage rack for lifting a pair of bicycles by means of a pulley system into a vertically oriented storage position adjacent to the ceiling of a garage or other enclosure. U.S. Pat. No. 3,907,113 to Kropelnitski also employs a hoist system for supporting a plurality of bicycles from the ceiling or roof of a building. In U.S. Pat. No. 5,183,162 to Ritzenthaler the bicycle is supported on a mount which rides along a track attached to a wall, or wall and ceiling of an enclosure, and a pulley arrangement will advance the mount and bicycle into a raised storage position. Other representative patents are U.S. Pat. Nos. 3,770,133 to Kolker, 3,883,002 to Moore and 5,199,843 to Sferra.

Among other considerations associated with the storage of cumbersome articles, such as, bicycles in confined areas are to minimize the power requirements for lifting one or more bicycles into an out-of-the-way position within a confined area, such as, a garage or patio and to permit the bicycle(s) to be lifted or lowered in a single movement with maximum mechanical advantage. Further, it is desirable to provide apparatus which is extremely compact, occupies a minimum of space and is easily operated and controlled.

SUMMARY OF INVENTION

It is therefore an object of the present invention to provide for a novel and improved lift and storage apparatus for storing bulky or cumbersome articles in an out-of-the-way position in an efficient and highly reliable manner.

It is another object of the present invention to provide for a novel and improved apparatus for storing bicycles in an overhead position within a confined area, such as, a garage or patio which is extremely compact, simplified and minimizes the danger of theft or damage.

It is a further object of the present invention to provide for a novel and improved lift and storage apparatus for cumbersome articles, such as, bicycles which employs a minimum number of parts and has minimum power requirements with maximum mechanical advantage so as to simplify the installation and operation of the apparatus.

It is an additional object of the present invention to provide for a novel and improved lift/storage apparatus for bicycles having a lever type support member for one or more bicycles which can be easily swung into and out of an overhead storage position in a single movement.

In accordance with the present invention, a preferred form of lift and storage apparatus has been devised for bicycles in which one or more bicycles are supported in an upright position on a floor or other ground surface, a lift arm is mounted for vertical movement above the floor, the bicycle support being pivotally connected to the lift arm so that when the lift arm is raised the bicycle support is free to undergo independent pivotal movement from an upright position on the floor to a raised substantially horizontal position above the floor. In the preferred form, a lift mechanism is provided for lifting the lift arm to a substantially vertical position, and a cam surface is engageable with a cam member on the bicycle support to cause the support to be independently pivoted about the lift arm in raising the support into the horizontal position as described.

The lift and storage apparatus of the present invention is specifically adaptable for use in enclosed areas, such as, a garage or patio with the lift arm pivotally connected to a vertical wall, and a lift mechanism mounted on the wall includes a cable trained over a pulley and connected to an outer end of the lift arm in raising the lift arm toward the vertical position. The cam surface is disposed above the lift arm in the path of movement of the cam member on the bicycle support to cause independent swinging or pivotal movement of the bicycle support into the raised horizontal position substantially parallel with the ceiling of the enclosed area.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is a side view, partially in section, of a preferred form of lift and storage apparatus in accordance with the present invention;

FIG. 2 is a front view of the lift and storage apparatus shown in FIG. 1;

FIG. 3 is a side view of the preferred form of apparatus shown in FIG. 1 in a partially raised position of approximately 45°;

FIG. 4 is another side view of the preferred form of lift and storage apparatus of FIG. 1 in a raised position of approximately 60°;

DETAILED DESCRIPTION OF PREFERRED EMBODIMENT

Figure 5:
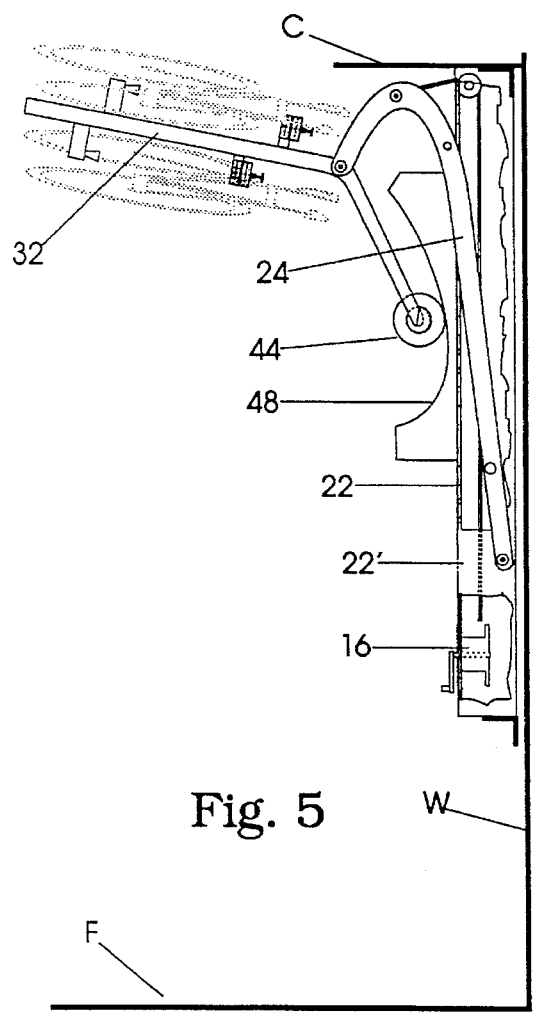
FIG. 5 is another side view of the preferred form of invention shown in FIG. 1 in a substantially fully raised position.

Referring in more detail to FIGS. 1 and 2, a preferred form of lift and storage apparatus 10 is shown installed in an enclosed area, such as, a garage having a floor surface F, vertical wall W and horizontal ceiling C. Installation of the apparatus 10 in a garage is given more for the purpose of illustration but not limitation and is merely representative of different areas or enclosures where the apparatus may be mounted either inside or outside of a building. As will become more apparent, the apparatus 10 can serve either as a stand-alone unit or be mounted on the wall of a building.

In the setting described, the apparatus 10 includes a wall mount 12 which is in the form of a generally channel-shaped member extending vertically from the ceiling over the greater length of the wall W to terminate at a point relatively near the floor surface F. The channel-shaped member is anchored by suitable bracket members 13 and 14 at the top and bottom edges, respectively and, in anchored relation, defines a chase or enclosed area for a lift mechanism in the form of a winch 16 mounted internally of the lower end of the wall mount 12 with a cable 18 extending upwardly through the wall mount 12 and trained over a pulley 20.

The channel-shaped wall mount 12 includes a closed end 22 in spaced facing relation to the wall W and opposite sides 23 in forming the enclosed area for the lift mechanism as described. A recessed area 22' is formed in the closed end 22 for mounting and insertion of lift arm member 24. The lift arm member 24 is comprised of a pair of arm portions 25 and 26 which are united in closely spaced parallel relation to one another by cross braces 27, 28 and 29, the brace 29 also serving as a pivot shaft for pivotal connection of the one end of the lift arm member 24 within the wall mount 12 and specifically wherein the pivot shaft 29 extends between opposite side walls 23 to support the lift arm member for swinging movement about a horizontal axis. Preferably, the lift arm member 24 extends in a substantially horizontal direction but inclined in a gradual downward direction away from its pivotal connection for a distance or length greater than the height of a bicycle. The lift arm portions 25 and 26 each terminate in a downward return or reverse curved end portion 30, the cross brace 27 extending across or between lower extremities of the returns 30. A brace 28 extends between the arm portions 25 and 26 at the rounded end of the return, and the cable 18 inclines downwardly away from the pulley 20 for attachment to the cross brace 28 to control lifting and lowering of the arm member 24.

A bicycle support member 32 is comprised of a pair of vertical posts or standards 33 and 34 interconnected by cross braces 35, 36, 37 and 38 to effectively unify the post members 33 and 34 into a rigid bicycle support assembly. In addition, upper ends of the post are united with the arm portions 25 and 26 by the cross brace 27, from which the bicycle support 32 extends upwardly and rearwardly in the form of closely spaced, parallel roller-support arms 39 and 40 and which terminate in upper extremities provided with bushings, not shown, for journaled mounting of a roller shaft 42 for a roller member or tire 44 mounted for rotation on the shaft 42. The roller 44 is disposed above the lift arm member 24 and the support arms 39 and 40 extend upwardly through the spaced arm portions 25 and 26 of the lift arm 24 so that the bicycle support unit 32 is movable with the lift arm 24 when advanced between a raised and lowered position but is pivotal independently of the lift arm about the pivot shaft 27 for a purpose to be hereinafter described. Limit stops 45 are disposed on the arm portions 25 and 26 at the upper ends of the returns 30 to limit outward counter-clockwise movement of the support member 32, for example, as shown in FIGS. 3 and 4.

In order to control pivotal movement of the bicycle support 32, a narrow elongated cam body 46 is affixed to the closed end surface 22 of the wall mount 12 and has a generally concave, vertically extending cam surface 48 facing in a direction away from the wall mount 12. The cam body 46 is located intermediately between the pivotal end 29 of the lift arm 24 and the upper pulley 20 so as to be in the path of movement of the roller 44 when lifted by the cable 18 through the progressive angles of lift as illustrated in FIGS. 3 to 5.

Thus, as shown in FIG. 3, when the lift arm 24 has been lifted to an approximate 45° angle, the roller 44 will be at an attitude or angle approaching the upper end of the cam surface 48. As the lift arm 24 approaches an approximate 60° angle, as shown in FIG. 5, the roller 44 will have approached the upper end of the cam surface 48. Under continued upward swinging movement of the lift arm 24 to an approximate angle of 80° to 85°, as shown in FIG. 5, the roller will be constrained to roll downwardly along the cam surface 48 thereby causing the bicycle support unit 32 to pivot upwardly about the pivot member 27 until the bicycle support assumes approximately a horizontal position substantially parallel to the ceiling C of the garage G. Thus, the lever action of the cam surface 48 acting against the roller 44 is extremely important in causing the bicycle support unit 32 to swing upwardly into the stored position with optimum leverage achieved between the cam surface and bicycle support unit in supporting one or more bicycles on the unit 32. Once in the raised position as illustrated in FIG. 5, the lift arm 24 may be locked in place by inserting a pin, not shown, through aligned openings 50 and 51 in the sides 23 of the wall mount 12 and lift arm 24.

Figure 6:
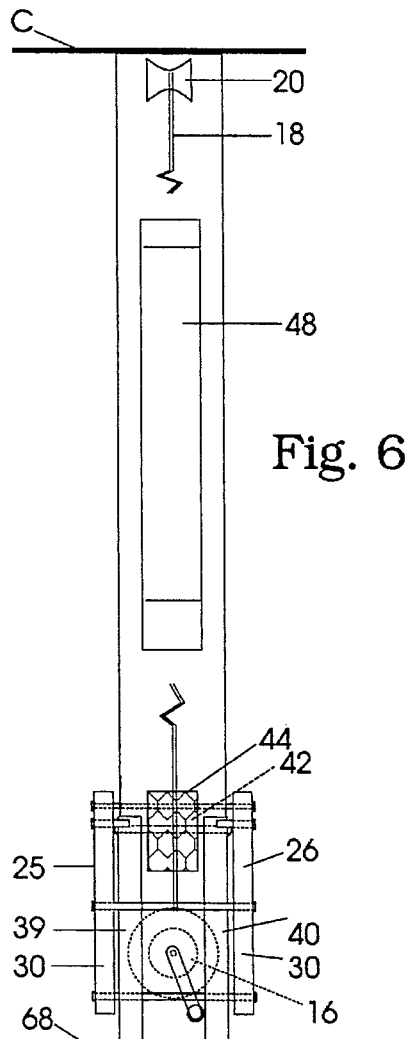
FIG. 6 is a front view of the preferred form of lift and storage apparatus illustrating a pair of bicycles mounted on the lower bicycle support of the apparatus.

Considering further the construction and arrangement of the preferred form of bicycle support unit 32, each of the cross braces 35 and 36 has a lateral projection 55 with an upwardly projecting pin 56 which, for example, is inserted into the fork between the bicycle pedals and rear wheel in order to facilitate attachment of a lower portion of each bicycle to an opposite side of the bicycle support. Upper handlebar-engaging brackets 58 project in opposite lateral directions from the bicycle support unit, each including a spring-loaded clamping portion 59 cooperating with a notched portion 60 on the bracket and threadedly adjustable downwardly to securely clamp a portion of the handlebar therebetween. Preferably, both the lower brace members 35 and 36 and upper brace members 37 and 38 are vertically staggered or offset with respect to one another, the bicycle supporting ends of the braces extending in opposite directions so that a pair of bicycles may be mounted on opposite sides of the bicycle support unit 32 and not interfere with one another, as best seen from FIG. 6. Further, referring to FIG. 2, the upper brace members 37 and 38 are preferably in the form of square tubes which telescopingly receive the brackets 58 to permit lengthwise adjustment of the brackets relative to the bicycle support posts 33 and 34; and each tube 64 is secured to a post 33 by a pivot pin 66 and to a post 34 by a manually adjustable fastener 68. The fasteners 68 are preferably in the form of bolts which are slidable in vertically elongated slots in each of the posts 33 and 34 with wing nuts to releasably lock the bolts in position on each of the posts according to the height of each bicycle. In other words, each of the brackets 58 may be adjusted upwardly or downwardly by pivotal movement about the pivot pins 66 until properly aligned with the handlebar of each bicycle to be stored.

The winch 16 may either be a manual or motor-controlled winch with a braking element which will permit the cable to be locked either in the raised or lowered position in accordance with conventional practice. As a fail-safe measure, the lift arm 24 may be locked in the raised position by inserting a locking pin, not shown, through openings 51 in the lift arm 24 which will have moved into alignment with openings 50 in the sides 23 of the wall mount 12. It will be appreciated that, while the invention has been illustrated as a fixed assembly within a garage or patio with the wall mount 12 anchored to one wall W, it is readily conformable for use as a stand-alone unit simply by extending the wall mount 12 downwardly so that its lower end is in horizontal alignment with the lower end of the bicycle support 32. The wall mount then may either be temporarily anchored to the floor or ground or to a supporting wall.

It is therefore to be understood that while a preferred form of invention is herein set forth and described, various modifications and changes may be made in the construction and arrangement of parts without departing from the spirit and scope of the present invention as defined by the appended claims and reasonable equivalents thereof.

I claim:

1. In storage apparatus for bicycles and like articles:

support means for supporting at least one article in an upright position on a floor or other ground surface;

a lift arm including means mounting said lift arm for vertical movement above the floor;

means pivotally connecting said support means to said lift arm for pivotal movement of said support means with respect to said lift arm; and pivotal control means in the path of movement of said support means when said lift arm undergoes vertical movement to impart pivotal movement to said support means between said upright position on the floor and a raised, substantially horizontal position above the floor.

2. A storage apparatus according to claim 1, wherein said support means includes a cam member engageable with said pivotal control means.

3. A storage apparatus according to claim 2, wherein said pivotal control means includes a stationary cam surface disposed in the path of movement of said cam member when said lift arm undergoes vertical movement.

4. A storage apparatus according to claim 1, wherein said lift arm supporting means supports said lift arm for rotation about a pivot point spaced above the floor.

5. A storage apparatus according to claim 4, including lift means associated with said lift arm for raising and lowering said lift arm between a horizontally extending position and a substantially vertical position.

6. A storage apparatus according to claim 5, wherein said support means is pivotal independently of said lift arm.

7. A storage apparatus according to claim 5, wherein said lift means includes a winch, a pulley spaced above said winch and a cable extending from said winch over said pulley for connection to said lift arm.

8. A storage apparatus according to claim 1, said support means including upper and lower spaced brace members for suspension of a bicycle therefrom.

9. A storage apparatus according to claim 8, wherein said support means includes at least one vertical post member and said upper and lower brace members laterally project from opposite sides of said post member.

10. A lift and storage apparatus for bicycles and the like comprising:

support means for supporting at least one bicycle in an upright position on a floor or other ground surface;

a lift arm including means supporting said lift arm for rotation about a pivot point spaced above the floor;

means pivotally connecting said support means to said lift arm for independent pivotal movement of said support means with respect to said lift arm;

lift means associated with said lift arm for lifting said lift arm from a horizontally extending position to a substantially vertical position; and pivotal control means responsive to upward movement of said lift arm to impart independent pivotal movement to said support means from said upright position on the floor to a raised substantially horizontal position above the floor.

11. Apparatus according to claim 10, wherein said support means includes a cam member engageable with said pivotal control means.

12. Apparatus according to claim 11, wherein said pivotal means includes a stationary cam surface disposed in the path of movement of said cam member when said lift arm undergoes vertical movement.

13. Apparatus according to claim 10, wherein said lift means includes a winch, a pulley spaced above said winch and a cable extending from said winch over said pulley for connection to said lift arm.

14. Apparatus according to claim 10, wherein said support means includes at least one vertical post member, and said upper and lower brace members laterally projecting from opposite sides of said post member.

15. In lift and storage apparatus for storing bicycles in a building of the type having a floor, walls and ceiling, said apparatus comprising:

bicycle support means for supporting at least one bicycle in an upright position on the floor;

a lift arm including pivot means on one of said walls supporting said lift arm for rotation about a pivot point spaced above the floor;

means pivotally connecting said bicycle support means to said lift arm for independent pivotal movement of said bicycle support means with respect to said lift arm;

lift means including a cable connected to a free end of said lift arm for lifting said lift arm from a horizontally extending position to a substantially vertical position; and pivotal control means responsive to movement of said lift arm to impart independent pivotal movement to said support means between said upright position on the floor and a raised substantially horizontal position in proximity to the ceiling.

16. In apparatus according to claim 15, wherein said lift arm includes a stop member to limit independent pivotal movement of said bicycle support means with respect to said lift arm.

17. In apparatus according to claim 15, said lift arm having a reverse curved portion at its free end terminating in a lower extremity, and said bicycle support means pivotally connected to said lower extremity of said lift arm.

18. In apparatus according to claim 17, said lift arm including spaced parallel arm portions, and said bicycle support means including an upward extension passing through said arm portions and a roller member at an upper terminal end of said upward extension.

19. In apparatus according to claim 18, wherein said pivotal control means includes a generally concave surface portion mounted on said one wall above said lift arm.

* * * * *